United States Patent [19]

Okuda et al.

[11] 4,112,710
[45] Sep. 12, 1978

[54] DRIVE SHAFT FOR ROLLING MILLS AND THE LIKE

[75] Inventors: Hiroji Okuda, Nara; Shigenori Harada, Kashiharashi, both of Japan

[73] Assignee: Koyo Seiko Company Limited, Osaka, Japan

[21] Appl. No.: 816,088

[22] Filed: Jul. 15, 1977

[51] Int. Cl.² .............................................. F16D 3/06
[52] U.S. Cl. .................................... 64/23; 64/1 C; 403/166
[58] Field of Search ................ 403/166, 287; 64/23, 64/1 C, 8, 17 R, 21, 15 C

[56] References Cited

U.S. PATENT DOCUMENTS

| 514,990 | 2/1894 | Habersang et al. | 64/9 R |
|---|---|---|---|
| 1,330,363 | 2/1920 | Whitt | 403/166 |
| 1,474,701 | 11/1923 | Archibald | 403/166 |
| 2,556,380 | 6/1951 | Stillwagon, Jr. | 64/23 X |
| 3,171,269 | 3/1965 | Gilmore et al. | 64/23 |
| 3,180,164 | 4/1965 | Chung | 403/166 X |
| 3,204,429 | 9/1965 | Kayser | 64/21 |
| 3,303,894 | 2/1967 | Varney | 64/23 X |

FOREIGN PATENT DOCUMENTS

| 1,340,083 | 9/1963 | France | 64/9 R |
|---|---|---|---|
| 352,691 | 2/1921 | Fed. Rep. of Germany | 64/17 R |
| 876,222 | 5/1953 | Fed. Rep. of Germany | 403/166 |
| 1,910,284 | 9/1970 | Fed. Rep. of Germany | 64/1 C |
| 717,424 | 10/1954 | United Kingdom | 64/1 C |

*Primary Examiner*—Leslie Braun
*Attorney, Agent, or Firm*—Mason, Fenwick & Lawrence

[57] ABSTRACT

A shaft member connected to a drive fitting yoke by a joint member is splined to a shaft member connected to a driven fitting yoke by a joint member. A spring accommodated in a hollow chamber continuously extending through the shaft members axially biases the shaft members away from each other. Limiting means for limiting the maximum length of extension of the shaft members prevents the spring from exerting a thrust load on the drive shaft element and driven shaft element interconnected by the drive shaft. The spline coupling portion has an increased diameter to ensure the strength of the drive shaft.

5 Claims, 4 Drawing Figures

DRIVE SHAFT FOR ROLLING MILLS AND THE LIKE

BACKGROUND OF THE INVENTION

The present invention relates to a drive shaft for rolls in rolling mills and the like, more particularly to a drive shaft for connecting a drive shaft element to the roll neck portion of a rolling mill to drive the roll, the drive shaft incorporating two universal joints to maintain the drive shaft element in alignment with the roll serving as a driven shaft element.

Generally, drive shafts of this type are provided at the opposite ends with fitting yokes to be axially fitted to the end of a drive shaft element and to the end of a driven shaft element to connect the drive shaft to these shaft elements so that the drive shaft can be easily disconnected from the shaft elements for the replacement of the roll or the like.

FIG. 1 shows a conventional drive shaft. A shaft member B connected to a drive fitting yoke A by a joint member $J_1$ is splined to a shaft member D connected to a driven fitting yoke C similarly by a joint member $J_2$ for the transmission of torque as well as for axial sliding movement. Further as shown in FIG. 1, the drive fitting yoke A is connected to a drive shaft element G as by shrinkage fit with a key K also fastening the yoke to the drive shaft element G for the transmission of torque and also for preventing the axial movement of the yoke. The drive fitting yoke C is secured to a driven shaft element H by a bolt F or an unillustrated pin. During the rotation of the drive shaft, the shaft members B and D are slidable relative to each other with the shaft members B and D fitted and connected to the drive shaft element G and to the driven shaft element H respectively.

However, the drive shaft during rotation undergoes vibration or oscillation due to variations in the load or for some other cause, resulting in loosening, break or wear of the bolt F or pin and loading to improper shaft connection. Because the shaft members B and D are adapted for free sliding movement, the driven fitting yoke C will then slip off from the driven shaft element H, with the result that the rolling operation stops inavertently, thereby reducing the operating efficiency.

To overcome the foregoing drawback, another drive shaft as shown in FIG. 2 has been proposed. It is seen in FIG. 2 that the shaft members B and D are respectively provided with annular projections $B_1$ and $D_1$ each on the outer periphery of the shaft member, and a spring M is provided between the annular projections $B_1$ and $D_1$ to bias the shaft members B and D away from each other, such that the force of the spring M acts to fit the drive fitting yoke A to the drive shaft element G and the driven fitting yoke C to the driven shaft element H when connecting the drive shaft to the shaft elements. With the drive shaft thus mounted in place, the spring M acts similarly also during the rotation of the drive shaft so as to hold the driven fitting yoke C connected to the driven shaft element H against the rotational oscillation of the shaft. This structure eliminates the need for the bolt F shown in FIG. 1 or pin used for securing the driven fitting yoke C to the driven shaft element H, thus rendering the drive shaft easier to mount and dismount.

With the drive shaft shown in FIG. 2, however, the spring M has a large diameter because it is provided on the outer periphery of the drive shaft. Accordingly, the wire of the spring M must have an increased diameter in order to ensure a suitable spring force and a suitable amount of compression or expansion, but the swing diameter of the drive shaft is limited in the case of rolling mills. Thus, the limitations imposed on the diameter of the drive shaft and on the wire diameter of the spring M render the spring M difficult to design. Moreover, an increase in the diameter of the wire of the spring M entails the necessity of reducing the inside and outside diameters of the shaft member B to enable the shaft member B to retain its strength, further making it necessary to reduce the diameter of the spline coupling portion E between the shaft members B and D. This leads to an increase in the surface pressure acting in the direction of rotation on spline coupling portion E per spline tooth, thereby giving rise to increased resistance against the sliding movement involved and greatly deteriorating the strength of the spline coupling portion E. As a result, the drive shaft has reduced strength and a lowered torque transmitting capacity. The proposed drive shaft has another serious drawback that the force of the spring M acting to move the shaft members B and D away from each other is delivered by way of the joint members $J_1$, $J_2$ and fitting yokes A, C to the drive shaft element G and to the driven shaft element H to which the drive shaft is connected, consequently subjecting the shaft elements G, H to a thrust load at all times. The spring force thus acting on the joint members $J_1$, $J_2$ and further on the drive and driven shaft elements G, H subjects the joint members $J_1$, $J_2$ and the bearings supporting the shaft elements G, H to an excess thrust load, thereby greatly impairing the performance of the joint members and of the bearings. Thus, the drive shaft shown in FIG. 2 involves difficulties in the design and in the strength and has the drawbacks that it is not durable to use and adversely affects the neighboring mechanical parts associated therewith.

SUMMARY OF THE INVENTION

An object of this invention is to provide a drive shaft which is axially extensible by virtue of the sliding movement of the shaft members of the type described and which can be held extended to a length sufficient to maintain the connection of the drive shaft to drive and driven shaft elements by a spring without interfering with the collapsing of the drive shaft by the sliding of the shaft members when needed for the disconnection of the drive shaft as from the driven shaft element but permitting such disconnection with ease, the drive shaft further being effectively holdable in position against inadvertent disconnection without resorting to the use of any of the fastening means conventionally employed to fasten the driven fitting yoke to the driven shaft element, the drive shaft being characterized in that the spline coupling portion for transmitting torque between the shaft members is free of any excessive surface pressure which otherwise would act on the spline tooth to give rise to increased frictional resistance, so as to enable the drive shaft to have sufficient strength.

Another object of this invention is to provide a drive shaft of the type described in which the force of the spring acting between the shaft members while the drive shaft is connected to the drive shaft element and to the driven shaft element will not give any thrust load to joint members, and to the drive and driven shaft elements so as to completely eliminate the adverse influence to be otherwise exerted by the thrust load on the neighboring mechanical parts associated with the drive shaft.

Still another object of this invention is to provide a compact drive shaft including a spring disposed between the two shaft members which are prevented from separation during handling.

In order to fulfill the foregoing objects, this invention provides a drive shaft comprising two shaft members fitting together and extensible axially thereof, a spring provided between the shaft members and accommodated in a hollow chamber defined by and continuously extending coaxially through the shaft members, and means for limiting the maximum length of the spring in its expanded state to a given range and also limiting the maximum length of extension of the two shaft members.

According to the foregoing construction of this invention, the drive shaft is easily connectable to and disconnectable from the drive shaft element and driven shaft element, whereas during the rotation of the drive shaft, the drive or driven fitting yoke incorporated in the drive shaft is prevented from slipping off from the drive or driven shaft element to effectively stabilize the connection of the drive shaft to the shaft elements, thus enabling the drive shaft to operate properly free of any failure and thereby permitting the rolling mill to operate with improved efficiency.

Further according to this invention, the axially slidable portion of the drive shaft comprises a pair of cylindrical shaft members having a hollow chamber continuously extending through both the members. Since the spring for biasing the shaft members away from each other is accommodated in this hollow chamber which has a sufficient diametrical dimension and a sufficient axial length, the spring is easy to design with a suitable spring force and with a proper amount of compression or expansion. Additionally, it is possible to reduce the diametrical dimension of the drive shaft while giving satisfactory strength to the shaft and also to employ a spline coupling portion of an increased diameter for the transmission of torque between the two shaft members. The spline coupling portion is therefore positioned radially more outward from the center axis of the drive shaft, with the result that the spline coupling portion will receive a reduced surface pressure per spline tooth and therefore less frictional resistance involved in the sliding movement, allowing the drive shaft to be extended or collapsed with greater ease, lessening the wear of the spline coupling portion and permitting the drive shaft to possess sufficient strength.

The means for limiting the maximum length of the extension of the shaft members relative to each other by the action of the spring prevents the separation of the shaft members during handling, further confining the spring force within the shaft members and thereby completely eliminating the adverse effect to be otherwise produced by the thrust load on the drive and driven shaft elements, coupling members, fitting yokes and bearings supported the shaft elements.

Other objects and features of the invention will become more apparent from the following description.

DESCRIPTION OF THE PREFERRED EMBODIMENTS

Figure 1:
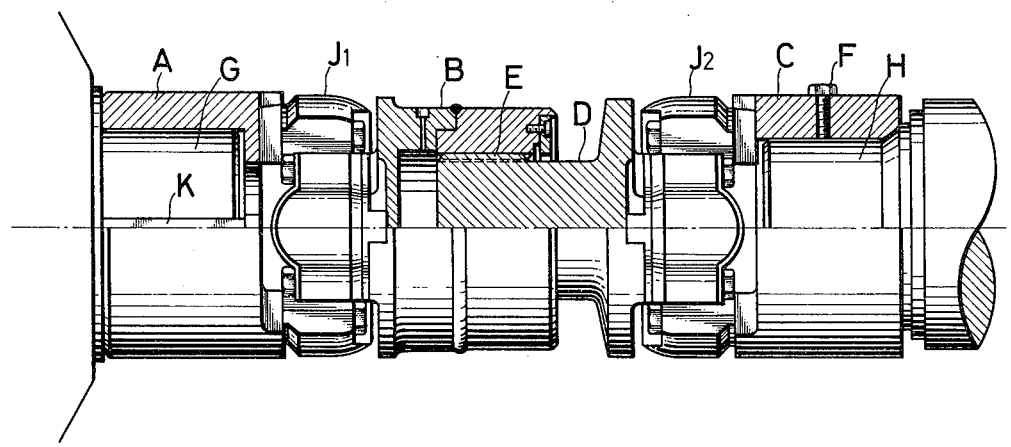
FIG. 1 is a front view of a conventional drive shaft, the upper one half of the shaft being shown in vertical section.
Figure 2:
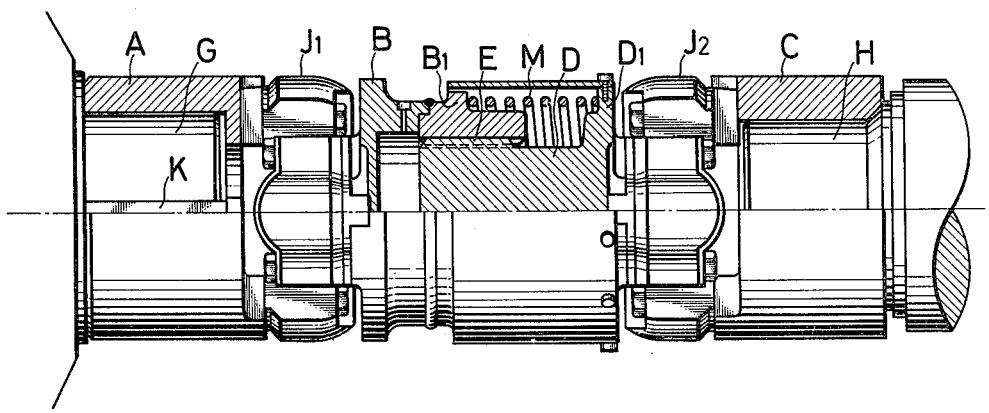
FIG. 2 is a front view of another conventional drive shaft, the upper one half of the shaft being shown in vertical section.
Figure 3:
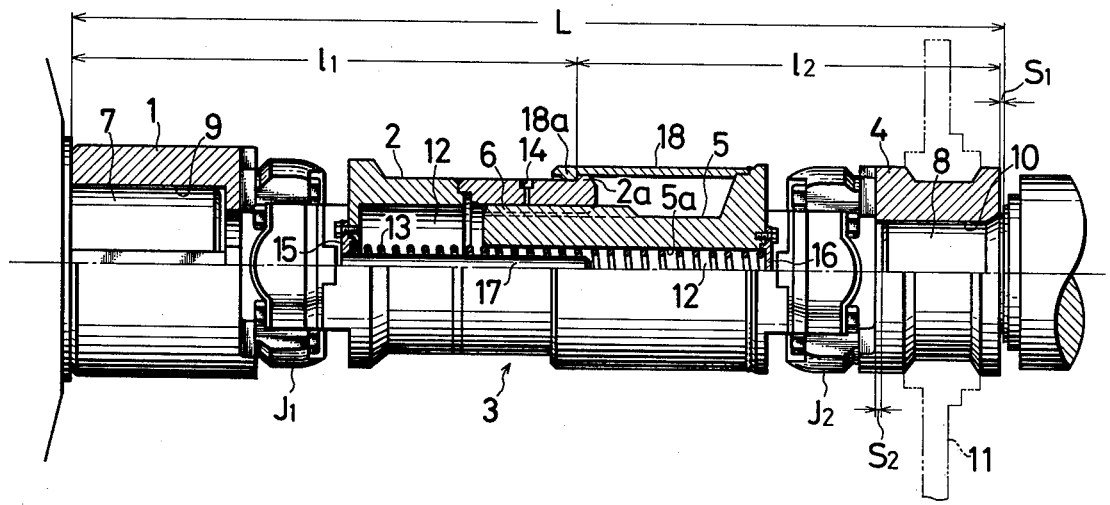
FIG. 3 is a front view of a drive shaft embodying this invention, the upper one half of the shaft being shown in vertical section.

FIG. 3 shows an embodimentof this invention. The drawing shows a drive fitting yoke 1 and a shaft member 2 coupled to the yoke 1 by a joint member $J_1$. These elements constitute a universal joint and provide one half, serving as a drive assembly, of the drive shaft 3. The drawing further shows a driven fitting yoke 4 and a shaft member 5 coupled to the yoke 4 by means of a joint member $J_2$. These members constitute a universal joint and provide the other half, serving as a driven assembly, of the drive shaft 3. The pair of shaft members 2 and 5 are each in the form of a sleeve and are splined to each other as at 6 for the transmission of torque and for an axial sliding movement, whereby the halves provide an extensible drive shaft.

The drive fitting yoke 1 and driven fitting yoke 4 fit around a drive shaft element 7 and a driven shaft element 8 at fitting portions 9 and 10 respectively where each of the yokes is made rotatable with the corresponding shaft element in the direction of the rotation of the shaft element by well known means. The distance from the base portion of the drive shaft element 7 to the base portion of the driven shaft element 8 in definite and invariable as indicated at L. The drive shaft 3, more specifically the driven fitting yoke 4, is engageable with and disengageable from the driven shaft element 8 by the collapsing and extension of the drive shaft 3 due to the sliding movement of the shaft members 2 and 5 relative to each other.

Unillustrated support means has a shifter 11 which clamps and pulls the driven fitting yoke 4 toward the drive assembly to disconnected the drive shaft 3 from the driven shaft element 8. The driven fitting yoke 4 is disengageable from the driven shaft element 8 by the leftward movement of the support means with its shifter 11 fitting around the fitting yoke 4. While the drive shaft 3 is connected to the driven shaft element 8 as well as during the rotation of the drive shaft 3, the shifter 11 is held out of engagement with the fitting yoke 4.

The pair of shaft members 2 and 5 coupled together are formed with a hollow chamber 12 extending coaxially therethrough and accommodating a spring 13 biasing the shaft members 2 and 5 away from each other. The spring 13 is compressible to such an extent as to permit the sliding movement of the pair of shaft members 2 and 5 required for the disengagement of the fitting yoke 1, 4 from the shaft element 7, 8. The spring 13 is further such that while the driven fitting yoke 4 is fitted around and connected to the driven shaft element 8, the spring 13 has its maximum extended length or is prevented from further extension while exterting a suitable biasing force on the pair of the shaft members 2 and 5. Accordingly, even when the fitting yoke 1 or 4 is subjected to an action which tends to slip off the yoke from the drive shaft element 7 or from the driven shaft element 8 owing to rotational oscillation or like cause during the rotation of the drive shaft, the displacement of the fitting yoke 1 or 4 from its proper fitting position produces forced compression of the spring 13 in proportion to the amount of the displacement, so that the resulting counteraction hampers the displacement. Thus, the spring 13 effectively prevents the removal of the fitting yoke 1 or 4 from the shaft element 7 or 8 or such displacement of the yoke that will adversely affect the function of the drive shaft, against rotational oscillation or like cause produced during the rotation of the drive shaft.

The provision of the spring 13 in the hollow chamber 12 formed in the shaft members 2 and 5 centrally thereof permits the spline coupling portion 6 to have an increased diameter without increasing the diameters of the shaft members 2 and 5, thus lessening the circumferential surface pressure acting on the spline coupling portion 6 per pline tooth and greatly mitigating the frictional resistance against the sliding movement involved.

The free extended length of the spring 13 is further so limited that the spring 13 will produce little or no spring action on the pair of the shaft members 2 and 5 while the drive fitting yoke 1 is in fitting connection with the drive shaft element 7 with the driven fitting yoke 4 connected to the driven shaft element 8.

Consequently, while the drive shaft is mounted in place, the spring 13 produces little or no action to press the fitting yokes 1 and 4 against the drive shaft element 7 and the driven shaft element 8 axially thereof. However, when oscillation or like cause involved in the rotation acts to slip off the fitting yoke 1 or 4 from the drive shaft element 7 or driven shaft element 8, the displacement if any of the yoke 1 or 4 from its proper fitting position will create a counteraction resulting from the forced compression of the spring 13 proportional to the displacement, with the result that the displacement can be hindered as already stated.

With the drive shaft 3 in its fitting position, the spring 13 is therefore nearly in its free state almost free of any compression even when subjected to pressure acting axially in alternating directions. The spring 13 is accordingly almost free of any fatigue. Furthermore since the closed hollow chamber 12 accommodating the spring 13 is defined by the inner cylindrical surfaces of the shaft members 2 and 5 and is in communication with the spline coupling portion 6, the lubricant applied to the spline coupling portion 6 through an oil port 14 ingresses into the chamber 12, lubricating the spring 13 to prevent the corrosion shaft member 5 or the like.

As a result, the structure described renders the spring 13 serviceable properly over a prolonged period of time, retaining the parts in position with stability over a prolonged time period.

The disconnect the drive shaft 3 from the drive shaft element 7 or driven shaft element 8, the drive shaft 3 must be collapsed against the action of the spring 13. Since the spring 13 is almost in its free state while the drive shaft 3 is in its fitting position, the drive shaft 3 can be forced to collapse with ease and smoothness by sliding the shaft members 2 and 5 relative to each other against the spring 13.

Springs seats 15, 16 are attached to the shaft member 2 and 5 respectively at the opposite ends of the hollow chamber 12 defined by the shaft members. The spring 13 is provided between the spring seats 15 and 16. In the driven assembly, the outer peripheral portion of the spring 13 is supported by the inner wall 5a of the shaft member 5 defining the hollow chamber 12. In the drive assembly, the inner peripheral portion of the spring 13 is supported by a guide bar 17 extending from the spring seat 15 secured to the shaft member 2, the guide bar 17 projecting into the hollow space defined by the inner wall 5a. The inner wall 5a and the guide bar 17 prevent the spring 13 from buckling.

A cover 18 is secured at its base end to the outer periphery of the shaft member 5 and has a forward end slidably fitting around the shaft member 2. The cover 18 is provided on the inner periphery of its front end with a projection 18a engageable with a projection 2a on the outer periphery of the inner end of the shaft member 2. The engagement between the projections 18a and 2a holds the shaft members 2 and 5 together against inadvertent disconnection when the drive shaft 3 is brought out of place as disconnected from the drive shaft element 7 or driven shaft element 8.

The engagement between the projections 18a and 2a serves to prevent the drive shaft 3 in its fitting position from extending to a length greater than is required. The spring 13 may be so adapted as to exert no biasing force on the shaft members when the drive shaft 3 is mounted in place. The cover 18 also serves to protect the spline coupling portion 6 from dust. A seal can be provided in the clearance between the cover 18 and the shaft member 2. The maximum extended length of the spring 13 can be limited by the engagement between the projections 18a and 2a.

With the drive shaft 3 fitted and connected to the drive shaft 7 and to the driven shaft 8, the spring 13 may bias the shaft members 2 and 5 away from each other, but the spring force is received by the shaft members 2 and 5 and is prevented from being delivered to the joint members $J_1$, $J_2$, fitting yokes 1, 4, drive shaft element 7 and driven shaft element 8.

State more specifically, the cover 18 limits the maximum distance over which the shaft members 2 and 5 are movable away from each other under the action of the spring 13 to a predetermined distance by virtue of the engagement between the projections 18a and 2a, thus limiting the range of the action of the spring 13 by which the shaft members 2 and 5 are movable away from each other. As already mentioned, the distance from the base portion of the drive shaft element 7 to the base portion of the driven shaft element 8 is limited to a definite distance L in FIG. 3. It is further supposed that the distance from the position of the engagement between the projections 18a and 2a to the outer end of the drive fitting yoke 1 is $l_1$, and that the distance from that position to the outer end of the driven fitting yoke 4 is $l_2$. The above-mentioned maximum distance is so limited that $L \geqq l_1 + l_2$, the distance $l_1 + l_2$ being the entire length of the drive shaft 3. Thus, axial clearances $S_1$ and $S_2$ are provided between the opposite axial ends of the driven fitting yoke 4 and the corresponding ends of the driven shaft element 8 respectively. Alternatively, such clearances can be eliminated where the yoke exerts no axial pressure on the driven shaft element 8.

Figure 4:
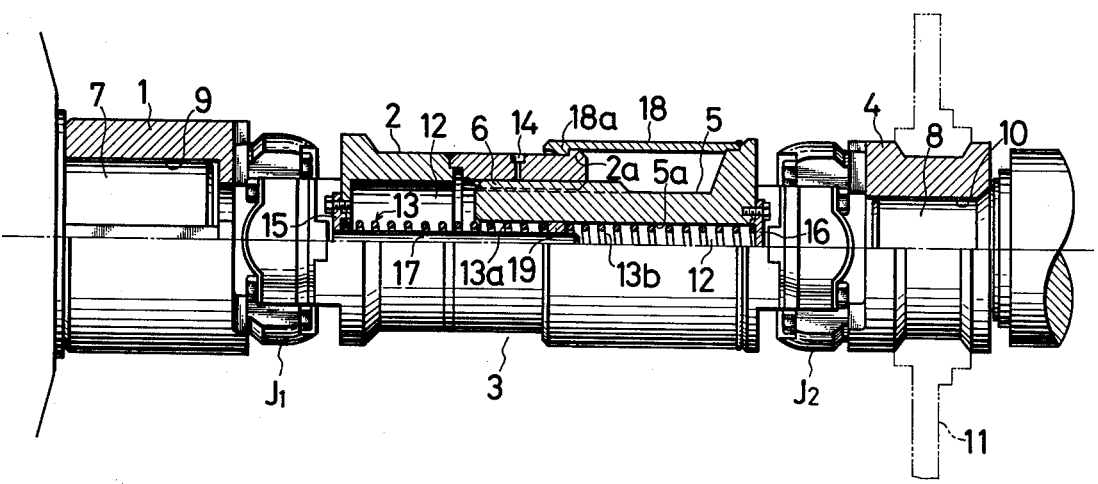
FIG. 4 is a front view of another embodiment of this invention, the upper one haft of the view being in vertical section.

FIG. 4 shows another embodiment of this invention in which the spring 13 in the foregoing embodiment is divided into two segments 13a and 13b with a spacer ring 19 provided therebetween. This makes it possible to prevent the buckling of the spring 13 more effectively and renders the spring easy to make.

What is claimed is:

1. A drive shaft for a rolling mill inter-connecting a drive shaft element and a driven shaft element for the transmission of torque and maintaining the drive shaft element in alignment with the driven shaft element comprising:

a drive fitting yoke fittable to the drive shaft element and rotatable therewith, a driven fitting yoke fittable to the driven shaft element rotatably therewith and detachably mountable on the driven shaft element, a sleeve-shaped drive shaft member connected to the drive fitting yoke by a joint member, the drive fitting yoke, the joint member and the drive shaft member providing a universal joint assembly, the drive shaft member being splined at its one end, a sleeve-shaped driven shaft member connected to the driven fitting yoke by a joint member, the driven fitting yoke, the second-mentioned joint member and the driven shaft member providing a universal joint assembly, the driven shaft member being splined and engaged with the splined end of the drive shaft member so as to be slidable only axially and to transmit the torque, the drive and driven shaft members being combined to define a hollow chamber coaxially extending through the shaft members, a spring disposed within the hollow chamber defined by the shaft members and biasing the shaft members axially away from each other, and means limiting the maximum length of axial extension of the shaft members, the limiting means restraining the shaft members from extension so that the entire length of the drive shaft is not greater than the definite invariable distance between the base portion of the drive shaft element and the base portion of the driven shaft element, whereby the limiting means prevent the biasing force of the spring from being delivered to the joint members, the fitting yokes, the drive shaft element and the driven shaft element when the drive shaft is mounted in place.

2. A drive shaft as defined in claim 1 wherein the limiting means comprises a projection formed on the outer periphery of one of the shaft members and a cover secured to the outer periphery of the other shaft member and covering the outer periphery of the projection on the shaft member, the cover being formed on its inner periphery with a projection engageable with the projection.

3. A drive shaft as defined in claim 1 wherein the spring has a free length permitting the spring to exert a biasing force on the shaft members before the shaft members are extended to the maximum length defined by the limiting means, the spring exerting no biasing force on the shaft members extended to the maximum length.

4. A drive shaft as defined in claim 1 wherein the spring has a free length permitting the spring to exert a biasing force on the shaft members extended to the maximum length defined by the limiting means.

5. A drive shaft as defined in claim 1 wherein the spring is divided into a plurality of segments longitudinally thereof with a spacer ring provided between the divided segments.

* * * * *